Figure 1:
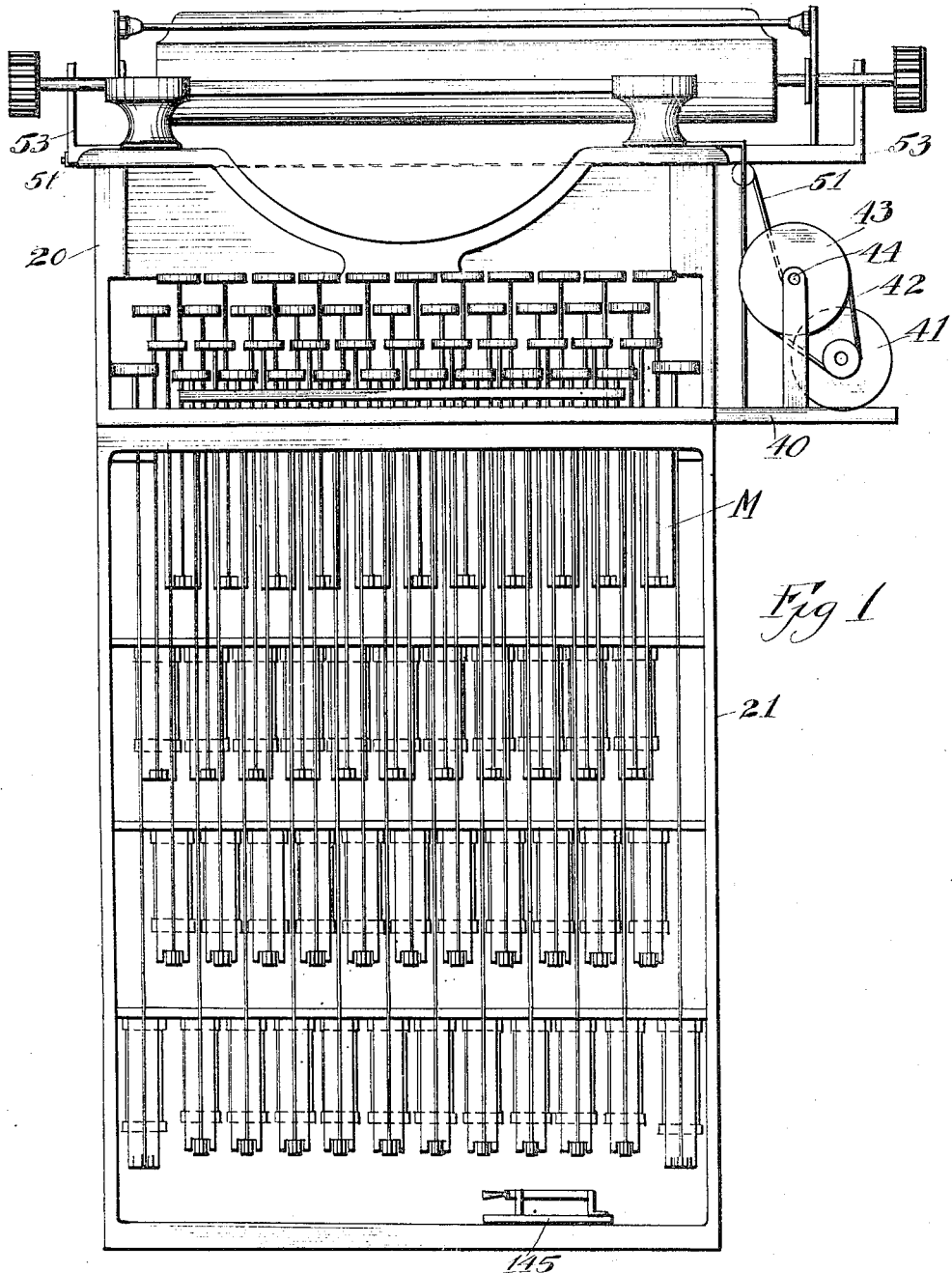

Jan. 15, 1924.

G. A. POND

AUTOMATIC TYPEWRITER

Filed Sept. 11, 1919

1,481,110

6 Sheets-Sheet 1

WITNESSES:

INVENTOR
GILBERT A POND
BY Albert C. Bell
ATTORNEY

Jan. 15, 1924.

G. A. POND 1,481,110

AUTOMATIC TYPEWRITER

Filed Sept. 11, 1919        6 Sheets-Sheet 3

WITNESSES:

INVENTOR
GILBERT A POND
BY Albert E. Bell
ATTORNEY

Jan. 15, 1924.  
G. A. POND  
AUTOMATIC TYPEWRITER  
Filed Sept. 11, 1919  
1,481,110  
6 Sheets-Sheet 4

WITNESSES:

INVENTOR  
GILBERT A POND  
BY Albert C. Bell  
ATTORNEY

Jan. 15, 1924. 1,481,110
G. A. POND
AUTOMATIC TYPEWRITER
Filed Sept. 11, 1919 6 Sheets-Sheet 5
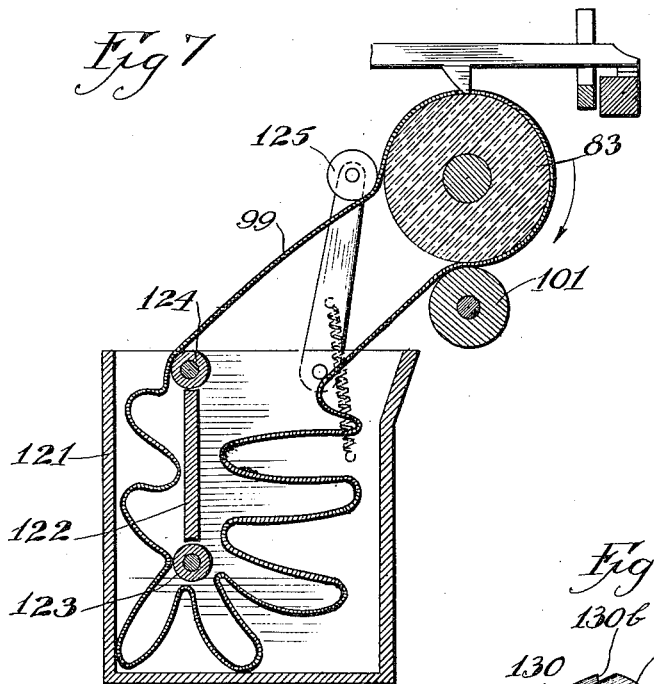
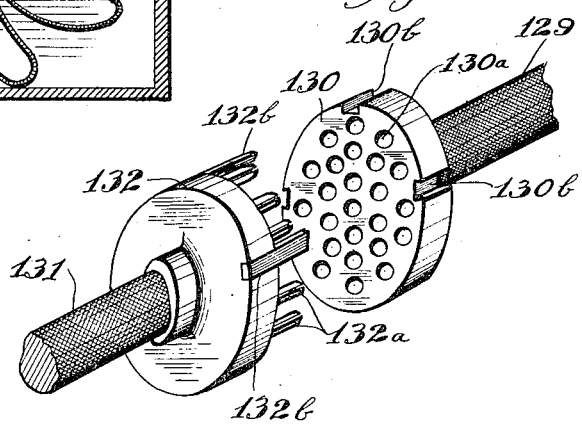
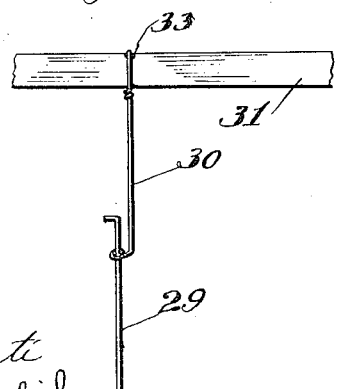
WITNESSES:
INVENTOR
GILBERT A. POND.
BY Albert E. Bell
ATTORNEY

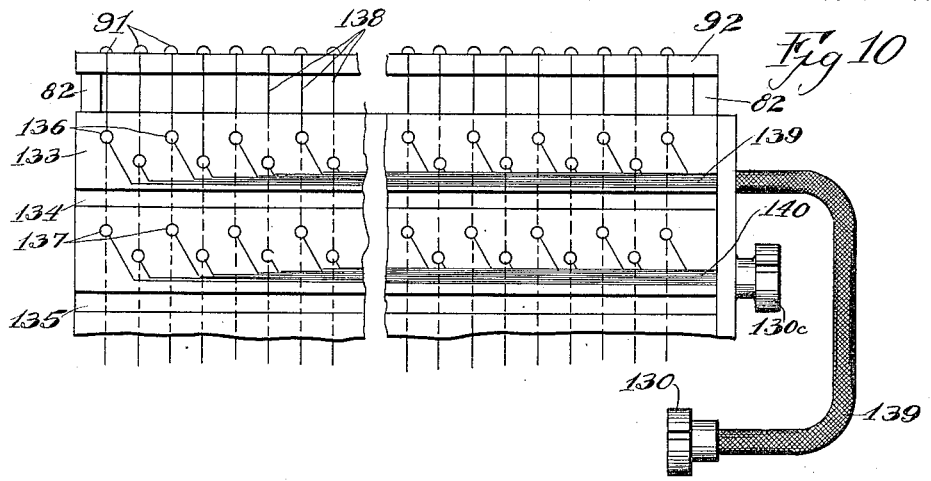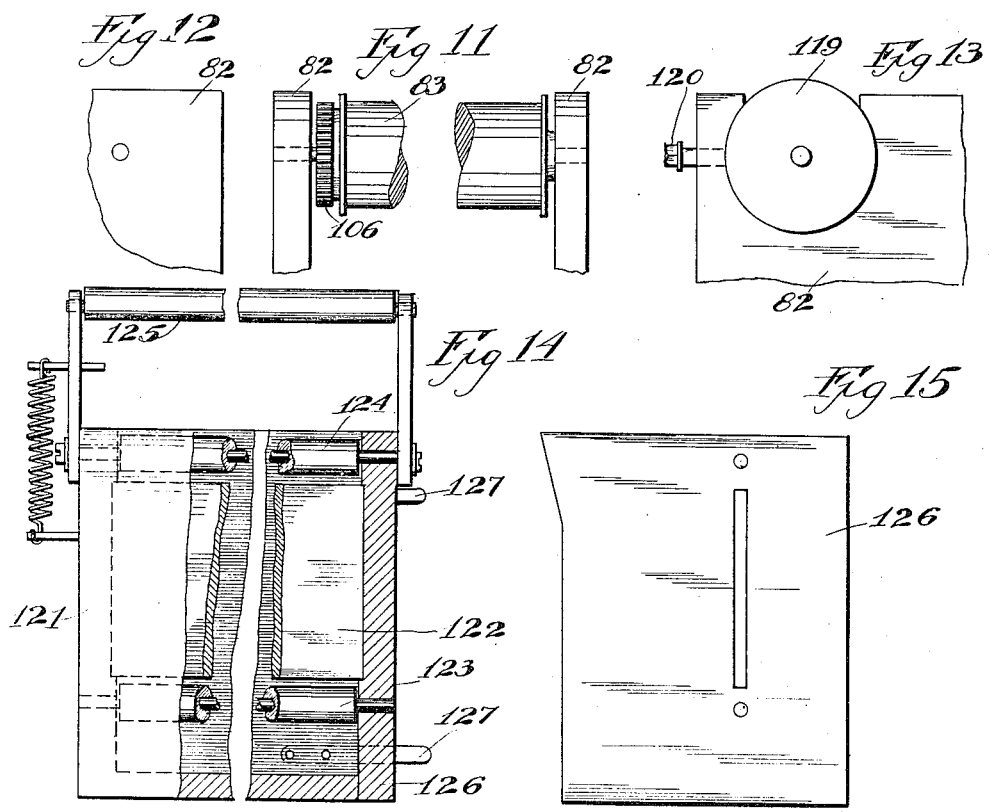

Patented Jan. 15, 1924.

1,481,110

UNITED STATES PATENT OFFICE.

GILBERT A. POND, OF EVANSTON, ILLINOIS, ASSIGNOR TO POND ELECTRIC WRITER, OF CHICAGO, ILLINOIS, A CORPORATION OF ILLINOIS.

AUTOMATIC TYPEWRITER.

Application filed September 11, 1919. Serial No. 323,195.

*To all whom it may concern:*

Be it known that I, GILBERT A. POND, a citizen of the United States, residing at Evanston, in the county of Cook and State of Illinois, have invented a new and useful Improvement in Automatic Typewriters, of which the following is a specification.

My invention relates to an improved form of automatic typewriters in which the operation of the typewriter is effected by electro-magnets directly connected with the parts to be operated thereby. A separate electro-magnet is provided for accomplishing each separate function that can be required of the typewriter and the connection of these electro-magnets to the typewriter is of such a nature as to not prevent the use of the typewriter manually if required. My invention also includes a novel means for controlling the electro-magnets connected with the typewriter for effecting its operation. To accomplish this I provide a circuit controller operated by a paper record strip having perforations by means of which the individual control of the electro-magnets connected with the typewriter is secured.

My invention is particularly adapted for use in connection with the making of many letters of identically the same kind where it is required that these letters shall be differently addressed and possibly contain different data in certain parts of the letter. There is a constantly growing demand for the writing of duplicate letters where each letter must be written on the typewriter as distinguished from mimeographing and my invention is particularly applicable to this purpose since each key on the typewriter is struck in much the same manner as it would be by the operator in making the letters manually.

My invention is applicable to any standard make of typewriter and does not require the rebuilding of the typewriter mechanism in order to secure its operation by the electro-magnets referred to.

My invention also contains operating mechanism for controlling the actuation of the various parts of the typewriter as will be more clearly understood by reference to the accompanying drawings showing a preferred embodiment of my invention in which—

Figure 2:
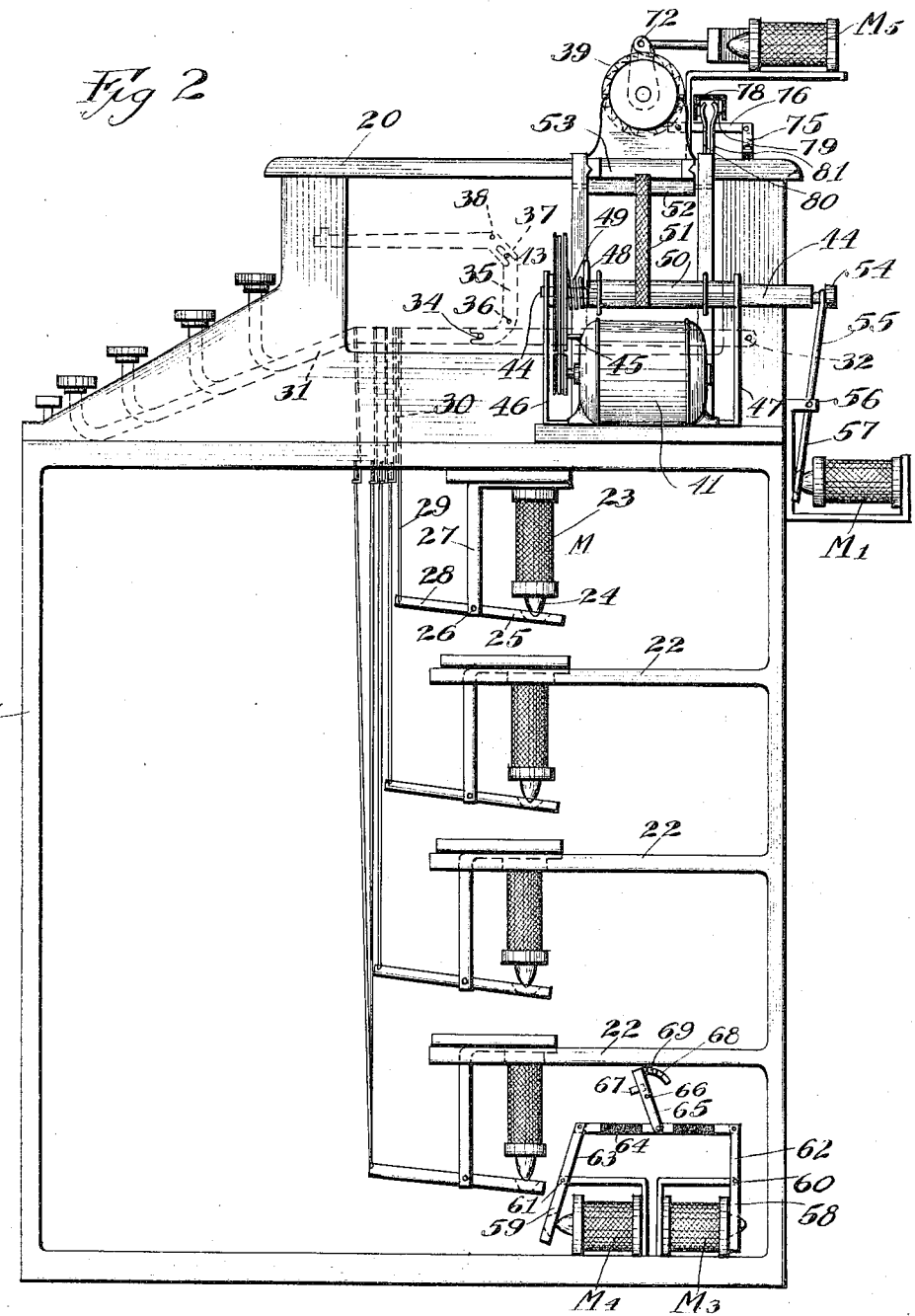
Figure 3:
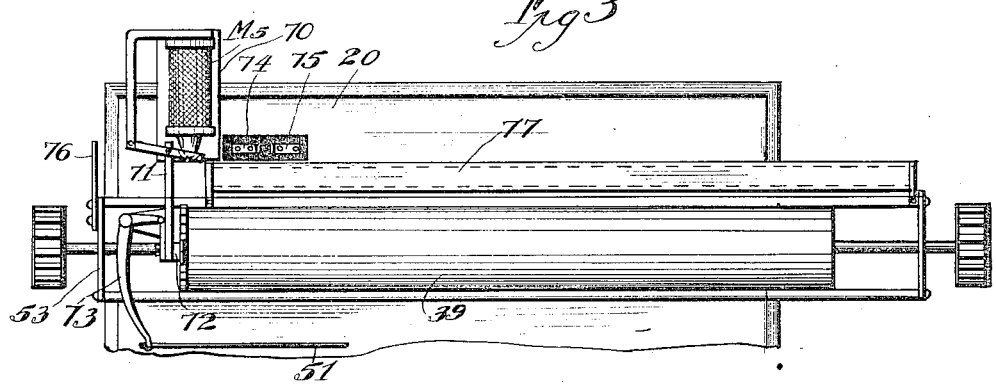
Figure 16:
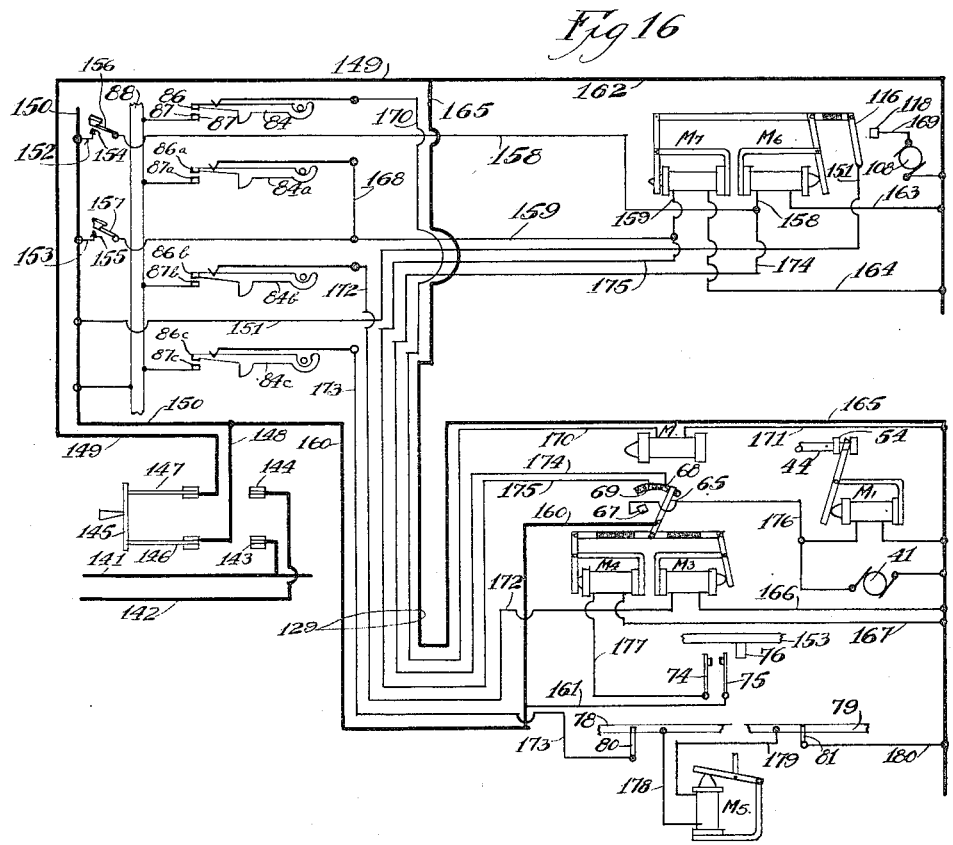
Figure 1:
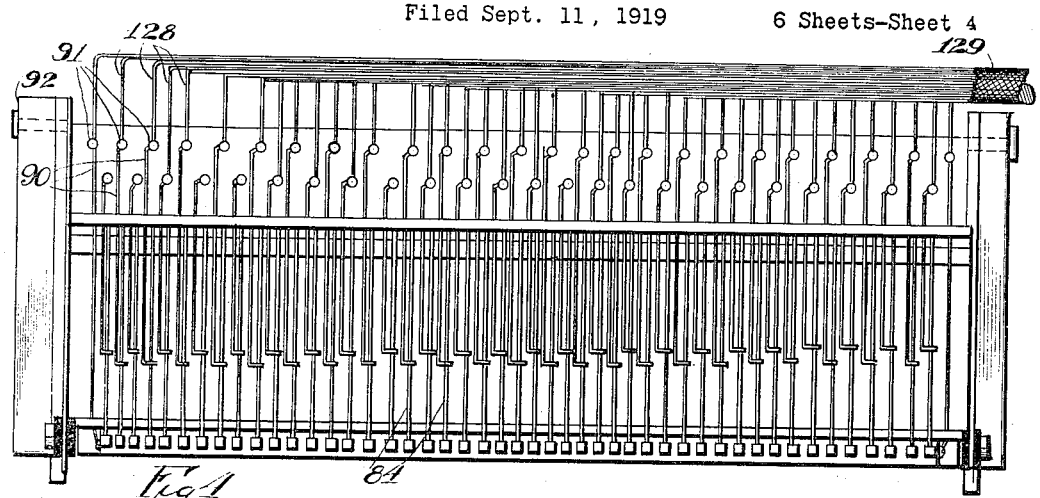
Figure 5:
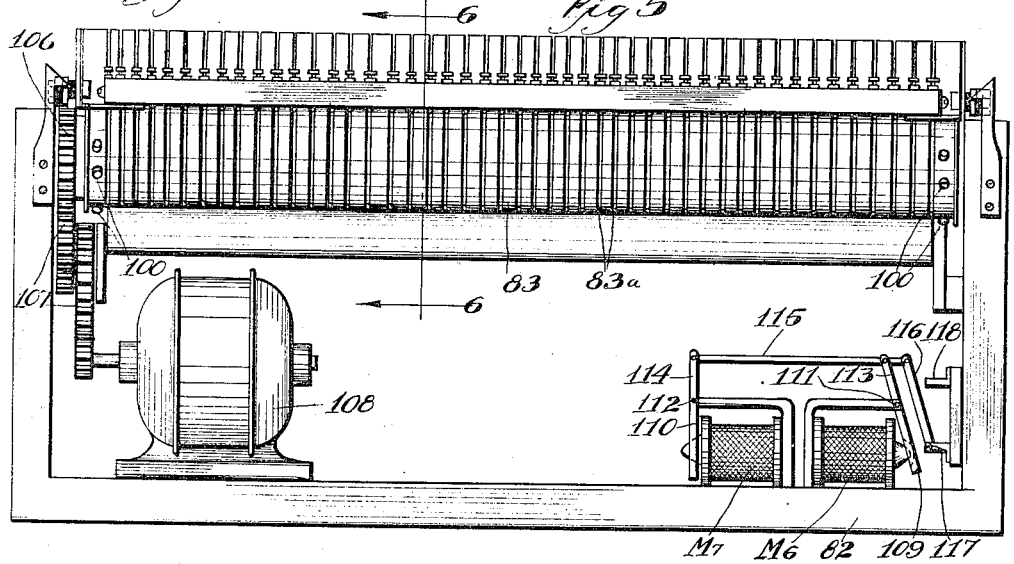
Figure 6:
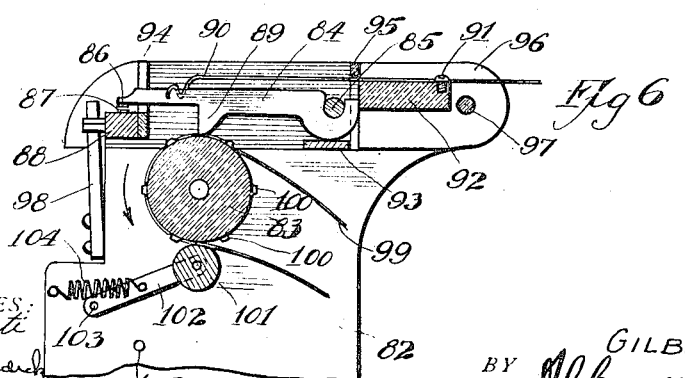

Fig. 1 shows in front elevation a typewriter with the operating magnets connected therewith, Fig. 2 is a side elevation of the parts shown in Fig. 1, Fig. 3 is a top view of the carriage of the typewriter, Fig. 4 shows a top view of the contact mechanism of the electric controller, Fig. 5 shows the electric controller in front elevation, Fig. 6 is a detailed view of the parts shown in Fig. 5 taken along the line 6—6, Fig. 7 is a detailed and diagrammatic view of the means employed to take care of the paper record or strip, Fig. 8 is a detailed view of the connecting plugs that may be used for connecting the electric circuits of the mechanism, Fig. 9 is a detailed view of the connection employed to the typewriter key bars, Fig. 10 is a detailed view of the circuit connections that may be employed from the controller to the cabling leading to the various typewriting machines to be operated thereby, Fig. 11 is a detailed view of the roller employed to drive the record strip, Fig. 12 is a detailed view of one of the bearings for the roller shown in Fig. 11, Fig. 13 is a detailed view of the other one of the bearings for the roller shown in Fig. 11, Fig. 14 is a detailed view of the box employed to contain the record strip, Fig. 15 is a view of the removable end of the box shown in Fig. 14, and Fig. 16 is a diagrammatic view of the circuit connections employed in connection with the typewriter mechanism and also in connection with the controlling mechanism.

Similar numerals refer to similar parts throughout the several views.

As shown in Figs. 1 and 2 a typewriter 20 of some standard make is shown resting upon a casing 21 which contains the electro-magnets M for operating the key bars of the typewriter. On account of the number of magnets required, one being necessary for each bar, they are arranged in several horizontal rows said rows being supported above each other by the top of the casing 21 and by shelves 22 placed in the casing. These magnets are of the same construction and similarly connected to the typewriter key bars and therefore it is necessary to describe but one of them as for example the electromagnet M as shown in Figs. 1 and 2. This electromagnet consists of a coil 23 having a pointed projecting core 24 for attracting an armature 25 pivotally connected at 26 with one end of a yoke 27 extending around the coil or winding 23 to engage the other end of the core 24. The armature 25 is extended beyond the pivot 26 to form a lever 28 pivotally connected at its end with a connecting wire 29 extending upwards through a suitable opening in the top of the casing 21 into engagement with a wire 30 connected with the key bar 31 at a considerable distance from the fulcrum 32 of the key bar. As more clearly shown in Fig. 9 the wire 29 has formed at its upper end a hook and the wire 30 has formed at its lower end an eye through which the wire 29 extends. The wire 30 is twisted around the key bar 31 and preferably held in place by the notch 33 formed in the key bar. As a result of the construction described a slip joint is formed between the wires 29 and 30 so that when the wire 29 is pulled downwards the wire 30 is also pulled downwards and with it the key bar 31 and thereby the type bar connected with the key bar is actuated. If however it is desired to actuate the key bar manually this may be done since the pressing of the key bar moves the wire 30 downward upon the wire 29 without motion of the wire 29 and the action of the key bar is practically the same as though the electric operating mechanism were not employed. The key bar 31 carries a pin 34 which engages the lower slotted end of a lever 35 pivotally supported at 36, the upper end of which lever carries a pin 37 engaging the slotted end of the type bar pivotally supported at 38, as a result of which when the key bar 31 is depressed the type bar is moved forcibly against the platen 39.

Each key bar of the type writer is connected in the manner above described with a corresponding electromagnet, whether said key bar is for the purpose of writing a letter, a numeral, or for controlling the operation necessary, as for example spacing, back spacing, tabulating, or shifting the carriage. While I have shown a typewriter of the shift key type it will be understood that I do not limit my invention to use in connection with this type of typewriter as the full key board machine may also be actuated in the same manner described if desired. Similarly typewriters of the double shift key type may be operated equally well, the only difference being in making the paper record strip to control the actuation of the various magnets in the proper manner. In the drawings I have illustrated the use of electromagnets of the single coil type for the reason that these electromagnets take up less room transversely of the machine, but it will be understood that I may employ magnets of any type that may be desired in carrying out my invention. To effect the return of the carriage of the typewriter at the end of each written line, the following mechanism is employed: A casing or support 40 is provided at the end of the typewriting mechanism which supports a motor 41 which drives by means of a belt 42 a wheel 43 mounted upon a shaft 44 supported in suitable bearings from the support 40. The wheel 43 is free to turn on the shaft 44 and has projecting from one side a pin 45. The shaft 44 is capable of longitudinal motion to a certain extent in its bearings 46 and 47 and said shaft has projecting therefrom a pin 48 for engaging the pin 45 when the shaft is in one of its positions. A spring 49 surrounds the shaft 44 between the wheel 43 and the pin 48 to prevent engagement between the pins 45 and 48 unless the shaft is moved longitudinally in a manner to be described. The shaft 44 carries a drum 50 between the bearings 46 and 47 to which drum one end of a tape 51 is secured which tape extends over a guide roller 52 and is secured at its other end to the carriage 53 of the typewriter. The right hand end of the shaft 44, for the position shown in Fig. 2, carries a grooved collar 54 engaging the upper end of a lever 55 pivotally supported at 56 and forming an upward extension of the armature 57 of the electromagnet $M^1$ forming a part of the mechanism controlling the return of the carriage. The operation of the motor 41 is controlled by electromagnets $M^3$, $M^4$ provided with armatures 58 and 59 pivotally supported at 60 and 61, said armatures having extensions 62 and 63 engaging at their outer ends a connecting link 64 of insulating material, to which the end of a switch 65 is pivotally connected. The switch 65 is pivotally supported at 66 and engages a contact 67 when the magnet $M^3$ is energized and is moved from engagement with said contact when the magnet $M^4$ is energized. It will be noticed that the mechanism connecting the magnets $M^3$ and $M^4$ is such that when the armature of either magnet is attracted the connecting parts move the armature of the other electromagnet away from its core ready for subsequent operation by the energization of said other magnet. The switch 65 is extended beyond its pivotal point 66 and engages contact 68 and 69 as it moves from its open to its closed position relatively to the contact 67, for a purpose to be described. As more clearly shown in Fig. 3, the carriage 53 has secured thereto a bracket 70 which supports a magnet $M^5$ the armature of which has pivotally connected thereto a link 71 the other end of which engages a lever 72 of the typewriter to turn the same in effecting line spacing. The magnet $M^5$ constitutes a means for effecting line spacing which is independent of the mechanism above described for moving the carriage to its initial position at the end of each line. If preferred a carriage return tape 51 may be connected directly with the outer end of the lever 73 employed to return the carriage of the typewriter to its initial position manually and at the same time effect the line spacing. As indicated in Fig. 3, the frame work 20 of the typewriter has mounted thereon and insulated therefrom two contacts 74 and 75 in the path of a bar 76 secured to the carriage 53, as a result of which when the carriage is moved to its initial position the bar 76 engages the contact 74 and moves it into electrical engagement with the contact 75 for a purpose to be described. The carriage 53 has secured thereto a bar 77 of insulating material, said bar being grooved on its under side to contain in spaced relation the metal strips 78 and 79 which are in sliding engagement with the contact springs 80 and 81 carried by and insulated from the frame work of the typewriter 20, as shown in Fig. 2. The purpose of the various electrical contacts and operation of the parts will be described in connection with the circuit diagram.

As shown in Figs. 4, 5 and 6, the controlling mechanism consists of a casing 82 which supports bearings for the ends of a feeding roller 83 above which a plurality of contact fingers 84 is disposed. As shown in Fig. 6 each contact finger is hooked shaped at one end to engage a pivot rod 85 and at its other end is provided with a contact 86 which engages a contact 87 carried by a common contact bar 88. Intermediate its end the finger 84 is provided with a downwardly extending tooth 89 immediately over the feeding roller 83. A spring 90 engages the finger 84 and extends rearwardly of the device and is secured by a suitable screw 91 to an insulating strip 92.

The fingers 84 rest on a strip 93 of insulating material under the pivot rod 85 by means of which strip said fingers are retained in engagement with the pivot rod. Slotted strips of insulating material 94 and 95 are provided at the ends of the fingers, which fingers rest in the slot in said strips and are held in proper position by said slots. The slots in the strip 95 also receive the springs 90 corresponding to the fingers 84 contained in said slots. The bar 88, the strip 92 and the strips 93, 94 and 95 are secured at their ends to supporting members 96 pivotally connected at their rear ends at 97 to the frame 82 of the controller. As a result of this construction the contact fingers and the supporting members associated therewith may be swung bodily on the pivots 97 when it is desired to remove the record strip from the controller and to place another record strip in position around the feed roller 83. Spring catches 98 are provided to hold the supports 96 with the fingers 84 in proper position relatively to the feed roller 83. The operation of the contact fingers 84 is controlled by a paper strip or record 99 passing around the feed roller 83 which strip serves to hold the fingers in elevated position against the action of springs 90 unless suitable perforation in said record strip occur in line with said fingers in which event when a perforation corresponding to any particular finger reaches a position immediately under the downwardly projecting tooth on said finger, the spring 90 moves said tooth through the aperture in the strip and contact is made between the contacts 86 and 87. Grooves 83$^a$ are formed in the feed roller 83 immediately under the contact fingers 84 to provide a clearance for the teeth 89 to permit them to drop a sufficient distance to positively bring the contacts 86 and 87 into engagement with each other and after said engagement the curved rear edges of the teeth 89 serve to move the fingers against the action of the springs 90 as the edges of the apertures in the record strip 99 pass under the fingers 89 thus separating the contacts 86 and 87 from each other. The feed roller 83 is provided at its ends with driving pins 100 for entering corresponding apertures in the edges of the record sheet 99 so as to positively drive said sheet and keep it from twisting laterally of the controller. A pressure roller 101 is mounted under the feeding roller so as to hold the record strip forcibly against the latter, said pressure roller being mounted on arms 102 pivotally supported at 103 from the frame work of the controller, said arms being held upward by springs 104 so as to hold the roller 101 forcibly against the record strip and thus move said record strip by the feeding roller 83. When it is desired to remove the record strip from the feeding roller, the arms 102 are moved downward, the relation of the springs 104 to the pivots 103 being such that they pass the center of said pivots and hold the arms 102 in downward position against the stop pins 105 projecting inwardly from the frame work 82. A gear 106 is rigidly secured to the end of the feeding roller 83 and this gear is connected by gearing 107 with a motor 108 employed to drive the feeding roller. The ratio of said gearing is preferably such that the feeding roller 83 will revolve at a slow rate relatively to the rate of rotation of the motor 108. Two electromagnets $M^6$ and $M^7$ are provided to respectively start and stop motor 108, said magnets being provided with armatures 109 and 110 pivotally supported at 111 and 112, said armatures having lever extensions 113 and 114 connected with a link 115 extending to and pivotally connected with the free end of a switch 116, which in turn is pivotally supported at 117 and arranged to engage a contact 118 when in closed position to control the operation of the motor 108 in a manner to be more fully described in connection with the circuit diagram.

As indicated in Figs. 11 and 12, the end bearings of the feed roller 83 are mounted in the side walls of the casing 82 and one of these bearings may be formed in a circular disk 119 held in place in the side wall by a screw 120 to facilitate removing said bearing to insert a new record strip when desired.

In connection with the writing of many identical letters it is desirable that the record strip shall be continuous, that is to say have its ends pasted together so as to constitute a loop. To facilitate taking care of the record strip as it leaves the feeding roller 83 and to provide for its proper feeding to the feeding roller, a box 121 may be employed to receive the strip as it leaves the roller 101, as shown in Fig. 7. The strip in entering the box 121 folds in a succession of loops which, particularly if the record be a long one, are apt to tangle and prevent the ready withdrawal of the other portion of the record strip which is to be fed to the roller 83. To prevent this action a vertical partition 122 is disposed in said box having guide rollers 123 and 124 adjacent its bottom and upper edges respectively. The record strip 99 is led around the bottom roller 123 from the bottom of the pile of loops contained in the box and is then drawn upwards between the partition 122 and the other side of the box 121 and then passing around the roller 124 it is led to the feeding roller 83. A pressure roller 125 similar to the pressure roller 101 may be mounted upon the box 121 in a manner similar to the mounting of the roller 101, in order to insure contact at the proper point between the record strip 99 and the feed roller 83 as said record strip is fed to the feeding roller. To facilitate removing the record strip 99 from the box 121, one side wall 126 of said box may be removable, in which event the partition 122 and the supports for the rollers 123 and 124 are rigidly mounted in the opposite side wall to hold said parts in proper relative position when the side wall 126 is removed. The removable side wall preferably is provided with recesses on its inner surface for receiving the ends of the partition 121 and the supports for the rollers 123 and 124, said side wall being held in place engaging said partition and supports by spring catches 127, as shown in Figs. 14 and 15.

As indicated in Fig. 4, the screws 91 beside serving to hold the springs 90 in place, also serve to connect wires 128 to said springs, said wires forming the various conductors of a cable 129 employed to extend the circuits controlled by the contacts 86 and 87, through the electromagnets shown in Figs. 1, 2 and 3. As shown in Fig. 8, the cable 129 may terminate in a multiple socket 130 provided with a plurality of conducting sleeves 130$^a$ one for each conductor to which said conductor is connected, said sleeves being mounted in insulating material. A second cable 131 similar to the cable 129 may be connected with a multiple plug 132 having a plurality of split conducting pins 132$^a$ projecting from a mounting of insulating material in the same arrangement as are the bushings 130$^a$, said split pins being connected respectively with the conductors of the cable 131 corresponding to the conductors of the cable 129 connected with the corresponding bushings 130$^a$. The mounting of the plug 132 is provided with a plurality of leader pins 132$^b$ projecting beyond the outer ends of the split pins 132$^a$ to enter corresponding grooves or recesses 130$^b$ in the mounting of the multiple socket 130, said leader pins being arranged in such manner that they will only enter the corresponding grooves or recesses in the multiple socket for one angular position of the plug relatively to the socket, as a result of which bringing the multiple plug into engagement with the multiple socket serves to connect the conductors of the cable 129 with the corresponding conductors of the cable 131 and thus facilitates connecting the controller with the typewriter actuating mechanism.

As indicated in Fig. 10, a terminal board 133 may be mounted on the back of the frame 82 of the controller to support a plurality of series of terminals 136 and 137, connected by wires 138 with the screws 91. Beneath the series of terminals 136, the terminal board 133 supports a shelf 134 for supporting a cable 139, the conductors of which are connected with the terminals 136 and a similar shelf 135 is disposed below the terminals 137 to support a second cable 140, the conductors of which are connected with the terminals 137, corresponding ones of the terminals 136 and 137 being connected together by the wires 138 leading to the terminal screws 91. The cable 139 may extend beyond the terminal board 133 to the typewriting mechanism to be controlled thereby or if preferred it may terminate in a multiple socket 130. If preferred one or more of the cables mounted upon the terminal board 133 may terminate in a multiple socket 130$^c$ rigidly secured to and mounted upon the terminal board. From the above it will appear that the controller may simultaneously exercise control over several typewriting mechanisms, each being connected to the controlling mechanism by its own cable of electric conductors.

As shown diagrammatically in Fig. 16, the circuit connections employed to operate my system are as follows: Current is supplied to the system by main conductors 141 and 142 connected respectively with the contacts 143 and 144 of a double pole switch 145, the switch blades 146 and 147 of which are connected respectively with conductors 148 and 149 for supplying current to the system. The wire 148 is connected with a wire 150 which in turn is connected with the common return bar 88 and also by wire 151 with the pivotal point of switch 116. The wire 150 is also connected by wires 152 and 153 with the contacts 154 and 155 of the push buttons 156 and 157, connected respectively by wires 158 and 159 with one terminal of the windings of the electromagnets $M^6$ and $M^7$.

The wire 148 has connected therewith a wire 160 extending to the typewriting mechanism and said wire 160 is connected by wire 161 to the switch spring 75 and is also connected to the pivotal point of the switch 65.

The wire 149 is connected by wire 162 with one terminal of the motor 108 and is also connected by wires 163 and 164 with the other terminals of the windings of the electromagnets $M^6$ and $M^7$ respectively.

The wire 149 is also connected with a wire 165 extending to the typewriting mechanism, which wire is connected with one terminal of the winding of the magnet $M^1$, with one terminal of the motor 41, with the spring contact 81, with one terminal of the winding of the electromagnet M, and by wires 166 and 167 respectively with one terminal of the windings of the electromagnets $M^3$ and $M^4$.

The wires 150, 160, 162 and 165 above described constitute the main supply conductors of the system and it will be noticed that the wires 150 and 162 extend to the controlling mechanism while the wires 160 and 165 extend to the typewriting mechanism from the supply conductors 148 and 149.

In the controlling mechanism the contacts 87, $87^a$, $87^b$ and $87^c$ are in electrical contact as above described with the common return bar 88. The finger $84^a$ connects by wire 168 with wire 159. The other terminal of the motor 108 is connected by wire 169 with contact 118 of the switch 116. The finger 84 is connected by wire 170 extending to the typewriting mechanism with one terminal of the winding of the electromagnet M, the other terminal of which is connected by wire 171 with the conductor 165. The fingers $84^b$ and $84^c$ are connected with wires 172 and 173 extending to the typewriter mechanism where they are connected with the other terminal of the winding of the electromagnet $M^3$ and the contact spring 80 respectively. The wires 158 and 159 are connected by wires 174 and 175 extending to the typewriting mechanism with the contacts 68 and 69 respectively of the switch 65.

At the typewriting mechanism the other terminals of the winding of the electromagnet $M^1$ and of the motor 41 are connected together and by wire 176 with the contact 67 of the switch 65. The other terminal of the electromagnet $M^4$ is connected by wire 177 with the contact spring 74. The contact bars 78 and 79 are connected by wires 178 and 179 with the terminals of the winding of electromagnet $M^5$ and the contact spring 81 is connected by wire 180 with the conductor 165.

As a result of the wiring described it will be observed that when the contacts 86 and 87 are brought together by the tooth of the finger 84 entering a perforation in the record strip, current flows through the following circuit assuming the main switch 145 to be in its closed position: wire 150, contact bar 88, contact 87, contact 86, finger 84, wire 170, electromagnet M, wire 171, conductor 165. As a result of the closing of this circuit, the electromagnet M is energized and remains in this condition as long as contacts 86 and 87 are in engagement. It will be understood that this engagement is momentary and that electromagnet M is simply one of a large number of electromagnets employed to operate the various levers of the typewriter. To start the record strip in operation the push button 156 is depressed closing a circuit as follows: wire 150, wire 152, contact 154, push button 156, wire 158, electromagnet $M^6$, wire 163, conductor 162. As a result of the closing of this circuit the electromagnet $M^6$ is energized and the switch 116 is moved to its closed position, closing the following circuit: wire 150, wire 151, switch 116, contact 118, wire 169, motor 108 to conductor 162. As a result of the closing of the last circuit the motor 108 is set in operation and this in turn operates the record strip in the manner above described.

When for any reason it is desired to stop the operation of the controller motor the push button 157 may be actuated closing the following circuit: wire 150, wire 153, contact 155, push button 157, wire 159, electromagnet $M^7$, wire 164 to conductor 162. As a result of the energization of the electromagnet $M^7$ the switch 116 is moved away from its contact 118 thus opening the circuit of motor 108. It frequently occurs during the writing of a form letter of the kind described that it is desirable to stop the automatic writing at one or more points during the writing of the letter for the purpose of inserting specially desired data at these points and to accomplish this, the operation of the record strip must be stopped at the proper point. This is done by means of finger 84ª which by its operation brings the contact 86ª into engagement with the contact 87ª closing the following circuit: wire 150, contact bar 88, contact 87ª, contact 86ª, finger 84ª, wire 168, wire 159, electromagnet M⁷, wire 164 to conductor 162. The energization thus accomplished of the electromagnet M⁷ serves the same purpose exactly as above described as a result of the actuation of the push button 157. At the end of the writing of each line the carriage of the typewriter is returned in the following manner: the finger 84ᵇ engages a suitable aperture in the record strip at this time and brings the contact 86ᵇ into engagement with the contact 87ᵇ. This closes a circuit as follows: wire 150, contact bar 88, contact 87ᵇ, contact 86ᵇ, finger 84ᵇ, wire 172, electromagnet M³, wire 166 to conductor 165. As a result of the energization of electromagnet M³, the switch 65 is moved into engagement with the contact 67 closing the following circuit: wire 150, wire 160, switch 65, contact 67, wire 176, and then in branched paths through the winding of the electromagnet M¹ and the motor 41 to conductor 165. As a result of the closing of this circuit the motor 41 is started and the shaft 44 is moved to bring the clutch pins 45 and 48 into engagement with each other which moves the typewriter carriage until the bar 76 engages the contact 75 and moves it into engagement with contact 74. This closes the following circuit: wire 150, wire 160, wire 161, contact spring 75, contact spring 74, wire 177, electromagnet M⁴, wire 167 to conductor 165. The closing of this circuit at the end of the return of the carriage to its initial position, energizes the electromagnet M⁴ which moves the switch 65 from engagement with its contact 67 thus opening the circuit of the motor 41 and of the electromagnet M¹. The deenergization of the electromagnet M¹ permits disengagement of the clutch pins 45 and 48 by the action of the spring 49, thus freeing the drum from its driving gearing to permit its free rotation under the action of the tape 51 during the advance of the carriage in writing the next line.

During the actuation of the carriage return mechanism, the switch 65 passes over the contact 68 closing the following circuit: wire 150, wire 160, switch 65, contact 68, wire 174, wire 158, electromagnet M⁶, wire 163 to conductor 162. Since at this time the switch 116 is in its closed position, no result follows this energization of the electromagnet M⁶. The circuit just traced is then broken by continued movement of the switch 65 and immediately afterwards said switch passes over the contact 69 closing the following circuit: wire 150, wire 160, switch 65, contact 69, wire 175, wire 159, electromagnet M⁷, wire 164 to conductor 162. This energization of the electromagnet M⁷ stops the controller motor 108 in the manner above described and insures that the next perforations in the record strip shall not be brought under the contact fingers until the carriage is in its initial position ready for the writing of the next line. It also provides a means for stopping the operation of the controller, if a part of the typewriter mechanism does not function properly, for if in any manner the carriage is prevented from completing its return movement, the operation of the entire mechanism is interrupted. It will be noted that the operating mechanism of both the switches 65 and 116 is so disposed relatively to the corresponding electromagnets, that either switch will stay in either position to which it may be moved. When, therefore, the electromagnet M³ is energized, even though but momentarily, by the operation of the finger 84ᵇ, the mechanism described provides for maintaining the operation of the actuating mechanism for a desired part of the typewriter, for a full cycle of operation of said actuating mechanism, regardless of whether the control circuit for said actuating mechanism remains closed during the entire cycle or not, and further provides for stopping the operation of said actuating mechanism at the end of its cycle of operation by devices controlled by the operated part of the typewriter and independently of any control exercised by the controller. This is desirable in connection with the operation of certain of the parts, for either due to the time element involved, or the inertia of the moving parts of the controller, or both, the finger 84ᵇ may be lifted by the record strip before the said cycle of operation is completed. If the clutch pins were operated mechanically by the electromagnets M⁴ and M³, under the conditions last referred to, the spring 49 would tend to open the switch 65 and interrupt the operation of the actuated part before the completion of its cycle.

When the electromagnet M⁴ is energized in the manner described, the switch 65 passes over the contacts 69 and 68 in the order named, successively closing the circuits above traced through the electromagnets M⁷ and M⁶ respectively. The energization of the electromagnet M⁷ produces no result since the switch 116 is at that time in its open position, but when the electromagnet M⁶ is subsequently energized the switch 116 is moved to its closed position, closing the operating circuit of the motor 108 and the record strip is again set in operation, which continues until the next energization of the electromagnet M⁷ either by operation of the push button 157, or the finger 84ª, or the switch 65 in the manner above described.

In addition to the above, therefore, the construction described provides a means for again starting the operation of the controller at the end of a cycle of operation of actuating mechanism of a part of the typewriter.

When an aperture in the record strip passes below the finger 84°, the contacts 86° and 87° are brought into engagement closing the following circuits: wire 150, bar 88, contact 87°, contact 86°, finger 84°, wire 173, contact spring 80, bar 78, wire 178, winding of electromagnet M⁵, wire 179, bar 79, contact spring 81, wire 180 to wire 165. As a result, the electromagnet M⁵ is energized and operates as above described to turn the platen one space. The line spacer of the typewriter is preferably set for its smallest advance, or "single" spacing and if a greater spacing is desired, a second line spacing aperture follows the first in the record strip and so on, until the paper in the typewriter is given the desired advance. In any event the next character controlling aperture in the record strip is sufficiently separated from the line spacing aperture longitudinally of the strip, to afford ample time for the line spacing mechanism to complete its operation before the next key of the typewriter is actuated.

In this way the mechanism for effecting line spacing is separate from the mechanism for returning the carriage and either may be operated independently of the other. For example, the carriage may be returned to underscore desired characters or words without turning the platen, and where a line ends in advance of the beginning of the next line to be written, the line spacing mechanism may be operated without returning the carriage.

It will be noted that the common supply conductors 160 and 165 and the individual control wires 170, 172, 173, 174 and 175 are shown extending in a group or cable 129 from the controller mechanism to the typewriter and its electromagnetic actuating mechanism. It will be understood that the wire 170 is merely representative of a large number of similar wires, each used to control the operation of one of the electromagnets M, which are used wherever a fixed electromagnet M is adapted, without the use of devices other than its armature and a connecting rod or wire, to actuate the desired part of the typewriter, as for example, the type bars, the shift key, the shift lock, the space bar, the tabulating key and the back spacer.

The record strip referred to, for controlling the operation of the fingers 84, 84ª, 84ᵇ, 84°, is not shown as it is similar to the record strips employed to control the operation of other automatic mechanisms, for example, piano players, electric signs, etc. The apertures formed in my record strip are preferably circular holes, and are spaced on the strip in the same relation that the corresponding operations of the parts of the typewriter must occur. In other words, with a single exception, the apertures must follow each other longitudinally of the strip with sufficient interval between them to permit the mechanism first actuated to clear on its return movement before the next mechanism is actuated. As a rule, two different control circuits must not be closed simultaneously. The exception referred to is that the line spacing and carriage return may operate simultaneously if both operations are desired. Again, while the shift key must be operated before operation of the next type bar, said shift key must be held depressed, unless locked, while the type bar is actuated; this may be accomplished by making the aperture for controlling the shift key, in the form of a slot through the record strip, beginning in advance of the aperture for the first shifted character and continuing without interruption somewhat beyond the aperture or last one of the series of apertures for the shifted characters.

From the above it will be observed that by my invention, each part of the typewriter to be actuated, is provided with controlling and operating mechanism of its own, separate from the other controlling and operating mechanisms; that each electromagnet may be designed to effectively perform its intended function and that no close or delicate adjustments are necessary. As a result my invention provides a simple and effective construction for securing the result intended. Also that since the feeding roller of the controller is not included in any of the electric circuits, there is no current flow between the fingers and feeding roller and therefore no arcing between said fingers at the record strip. The record strip is thus protected from damage of that kind.

While I have shown my invention in the particular embodiment above described, it will be understood that I do not limit myself to this exact construction as I may employ equivalents known to the art at the time of the filing of this application without departing from the scope of the appended claims.

What I claim is:

1. In a device of the class described, the combination of a feeding roller for receiving a perforated record strip, a motor, gearing continuously connecting said roller with said motor, a switch for controlling the operation of said motor, a first electromagnet for moving said switch to its closed position, and a second electromagnet for moving said switch to its open position.

2. In a device of the class described, the combination of a feeding roller for receiving a perforated record strip, a motor, gearing continuously connecting said roller with said motor, a switch for controlling the operation of said motor, a first electromagnet for moving said switch to its closed position, a second electromagnet for moving said switch to its open position, an armature for each of said electromagnets and mechanism connecting said armatures for simultaneous movement, whereby moving either armature to its attracted position moves the other armature to its retracted position.

3. In a device of the class described, the combination of a feeding roller for receiving a perforated record strip, a motor, gearing continuously connecting said roller with said motor, a switch for controlling the operation of said motor, a first electromagnet for moving said switch to its closed position, a second electromagnet for moving said switch to its open position, a pressure roller, pivoted supports for said pressure roller, and springs for holding said pressure roller against said feeding roller or away from said feeding roller as desired.

4. In a device of the class described, the combination of a feeding roller for receiving a perforated record strip, a motor, gearing continuously connecting said roller with said motor, a switch for controlling the operation of said motor, a first electromagnet for moving said switch to its closed position, a second electromagnet for moving said switch to its open position, and push buttons for controlling the operation of said electromagnets.

5. In a device of the class described, the combination of a roller for receiving a perforated record strip, contact fingers mounted adjacent said roller and tending to move towards said roller, contacts controlled by said fingers, a frame carrying said fingers, and pivoted supports for said frame, whereby movement of said frame on its pivots moves all of said fingers and contacts towards or away from said roller as desired.

6. In a device of the class described, the combination of a roller for receiving a continuous and perforated record strip, contact fingers mounted adjacent said roller and tending to move towards said roller, contacts controlled by said fingers, pivoted supports for said fingers and contacts whereby said supports may be moved with said fingers and contacts towards or away from said roller as desired, and a slotted guide for said fingers, said guide being secured to said pivoted supports.

7. In a device of the class described, the combination of a roller for receiving a continuous and perforated record strip, contact fingers mounted adjacent said roller and tending to move towards said roller, contacts controlled by said fingers, pivoted supports for said fingers and contacts whereby said supports may be moved with said fingers and contacts towards or away from said roller as desired, a slotted guide for said fingers, a terminal bar, and springs engaging said fingers and extending through the slots of said guide and secured to said terminal bar to form terminals for said fingers, said guide and terminal bar being secured to said pivoted supports.

8. In a device of the class described, the combination of a roller for receiving a continuous and perforated record strip, contact fingers mounted adjacent said roller and tending to move towards said roller, contacts controlled by said fingers, pivoted supports for said fingers and contacts whereby said supports may be moved with said fingers and contacts towards or away from said roller as desired, and a metal bar supporting a back contact for each of said fingers and forming a common electrical connection for said back contacts, said metal bar being secured to said pivoted supports, whereby motion of said supports towards or away from said roller produces no change in the adjustment of said contacts.

9. In a device of the class described, the combination of a roller for receiving a continuous and perforated record strip, contact fingers mounted adjacent said roller and tending to move towards said roller, contacts controlled by said fingers, pivoted supports for said fingers and contacts whereby said supports may be moved with said fingers and contacts towards or away from said roller as desired, a metal bar supporting a back contact for each of said fingers and forming a common electrical connection for said back contacts, said metal bar being secured to said pivoted supports, whereby motion of said supports towards or away from said roller produces no change in the adjustment of said contacts, a slotted guide for said fingers, a terminal bar, and springs engaging said fingers and extending through the slots of said guide and secured to said terminal bar to form terminals for said fingers, said guide and terminal bar being secured to said pivoted supports.

10. In a device of the class described, the combination of a roller for receiving a perforated record strip, control fingers mounted adjacent said roller and having teeth projecting towards said roller, said roller having grooves in alignment with said teeth to receive the same through the perforations in the record strip, contacts carried by the ends of said fingers, and a common conducting bar engaged by said contacts when actuated.

11. In a device of the class described, the combination of a roller for receiving a continuous and perforated record strip, a box for receiving the record strip in looped condition, and a partition in said box for guiding the record strip.

12. In a device of the class described, the combination of a roller for receiving a continuous and perforated record strip, a box for receiving the record strip in looped condition, a pressure roller, pivoted supports for said pressure roller, and springs for holding said last named supports towards or away from said first named roller as desired.

13. In a device of the class described, the combination of a roller for receiving a continuous and perforated record strip, a box for receiving the record strip in looped condition, a partition in said box for guiding the record strip, and guide rollers at the top and bottom of said partition, a side of said box at one end of said partition being removable to insert a continuous record strip around or remove the same from around said partition as desired.

14. In a device of the class described, the combination of a roller for receiving a perforated record strip, contact fingers mounted adjacent said roller and tending to move towards said roller, contacts controlled by said fingers, a frame carrying said fingers, pivoted supports for said frame whereby said frame may be moved with said fingers and contacts towards or away from said roller as desired, and means for holding said frame with said fingers adjacent said roller.

15. In a device of the class described, the combination of a roller for receiving a continuous and perforated record strip, and a framework carrying bearings for the ends of said roller, one of said bearings being removable from said framework and affording when removed a clearance for removing said roller from the other of said bearings.

16. In a device of the class described, the combination of a roller for receiving a continuous and perforated record strip, contact fingers mounted adjacent said roller and tending to move towards said roller, contacts controlled by said fingers, pivoted supports for said fingers and contacts whereby said supports may be moved with said fingers and contacts towards or away from said roller as desired, said fingers having hook-shaped pivot ends, and a pivot rod for said fingers carried by said supports, whereby any desired finger may be removed from its support without disturbing the remaining fingers.

17. In a device of the class described, the combination of a roller for receiving a continuous and perforated record strip, contact fingers mounted adjacent said roller and tending to move towards said roller, contacts controlled by said fingers, pivoted supports for said fingers and contacts whereby said supports may be moved with said fingers and contacts towards or away from said roller as desired, a slotted guide for said fingers, a terminal bar, springs engaging said fingers and extending through the slots of said guide and secured to said terminal bar to form terminals for said fingers, said guide and terminal bar being secured to said pivoted supports, said fingers having hook-shaped pivot ends, a pivot rod for said fingers carried by said supports, whereby any desired finger may be removed from its support without disturbing the remaining fingers, and a backing bar carried by said supports adjacent the closed side of the hook-shaped ends of said fingers.

18. In a device of the class described, the combination of a roller for receiving a perforated record strip, contact fingers mounted adjacent said roller and tending to move towards said roller, contacts controlled by said fingers, a slotted guide for said fingers, said fingers having hook-shaped pivot ends, and a pivot rod for said fingers, whereby any desired finger may be removed from its support without disturbing the remaining fingers.

19. In a device of the class described, the combination of a roller for receiving a perforated record strip, contact fingers mounted adjacent said roller and tending to move towards said roller, contacts controlled by said fingers, a slotted guide for said fingers, said fingers having hook-shaped pivot ends, a pivot rod for said fingers, springs extending through the slots of said guide and engaging said fingers, and a backing bar adjacent the closed side of the hooked-shaped ends of said fingers, whereby any desired finger may be removed from its support without disturbing the remaining fingers.

20. In a device of the class described, the combination of a movable carriage, a platen revolubly mounted on said carriage, devices for imparting a step-by-step movement to said platen, an electromagnet carried by said carriage, and operating mechanism between said electromagnet and said platen moving devices.

21. In a device of the class described, the combination of a movable carriage, a platen revolubly mounted on said carriage, devices for imparting a step-by-step movement to said platen, an electromagnet carried by said carriage, operating mechanism between said electromagnet and said platen moving devices, electric conductors extending from said electromagnet for controlling the operation of the same, and devices connected with said conductors comprising contact bars and contact springs in sliding engagement with said bars.

22. In a device of the class described, the combination of a movable carriage, a platen revolubly mounted on said carriage, devices for imparting a step-by-step movement to said platen, an electromagnet carried by said carriage, operating mechanism between said electromagnet and said platen moving devices, electric conductors extending from said electromagnet controlling the operation of the same, and devices connected with said conductors comprising contact bars and contact springs in sliding engagement with said bars, said contact bars being carried by and insulated from said carriage and said contact springs having a fixed support relatively to said carriage.

23. In a device of the class described, the combination of a longitudinally movable carriage, a roller carried by said carriage, an electromagnet carried by said carriage, devices connecting said electromagnet and said roller, whereby actuation of said electromagnet operates said roller, and electric conductors extending from said electromagnet for actuating the same for any position of said carriage.

24. In a device of the class described, the combination of a longitudinally movable carriage, a roller carried by said carriage, an electromagnet carried by said carriage, devices connecting said electromagnet and said roller, whereby actuation of said electromagnet operates said carriage, electric conductors extending from said electromagnet for actuating the same for any position of said carriage, and devices connected with said conductors comprising contact bars and contact springs in sliding engagement therewith.

25. In a device of the class described, the combination of a longitudinally movable carriage, a roller carried by said carriage, an electromagnet carried by said carriage, devices connecting said electromagnet and said roller, whereby actuation of said electromagnet operates said roller, electric conductors extending from said electromagnet for actuating the same for any position of said carriage, and devices connected with said conductors comprising contact bars and contact springs in sliding engagement therewith, said contact bars being carried by said carriage and said contact springs having a fixed support relatively to said carriage.

26. In a device of the class described, the combination of a feeding roller for receiving a perforated record strip, circuit closers actuated by said record strip, a first motor, a first gear train between said motor and said roller, a first switch for controlling the operation of said motor, operating means for opening and closing said switch, a framework, a carriage mounted for translatory movement on said framework, means for moving said carriage in a first direction, a second motor, a shaft for moving said carriage in a reverse direction, a second gear train connecting said second motor and said shaft, a second switch for opening and closing the operating circuit of said second motor, a first electromagnet for moving said second switch to its closed position, and a second electromagnet for moving said second switch to its open position.

27. In a device of the class described, the combination of a feeding roller for receiving a perforated record strip, circuit closers actuated by said record strip, a first motor, a first gear train between said motor and said roller, a first switch for controlling the operation of said motor, operating means for opening and closing said switch, a framework, a carriage mounted for translatory movement on said framework, means for moving said carriage in a first direction, a second motor, a shaft for moving said carriage in a reverse direction, a second gear train connecting said second motor and said shaft, a second switch for opening and closing the operating circuit of said second motor, a first electromagnet for moving said second switch to its closed position, a second electromagnet for moving said second switch to its open position, circuit connections from one of said circuit closers to said first electromagnet for operating the latter, said carriage having a projecting part, and contacts insulated from and carried by said framework in the path of said projecting part for controlling the operation of said second electromagnet.

28. In a device of the class described, the combination of a feeding roller for receiving a perforated record strip, circuit closers actuated by said record strip, a first motor, a first gear train between said motor and said roller, a first switch for controlling the operation of said motor, operating means for opening and closing said switch, a framework, a carriage mounted for translatory movement on said framework, means for moving said carriage in a first direction, a second motor, a shaft for moving said carriage in a reverse direction, a second gear train connecting said second motor and said shaft, a second switch for opening and closing the operating circuit of said second motor, a first electromagnet for moving said second switch to its closed position, a second electromagnet for moving said second switch to its open position, circuit connections from one of said circuit closers to said first electromagnet for operating the latter, and a circuit closer operated by said carriage and connected with said second electromagnet for operating the latter.

29. In a device of the class described, the combination of a feeding roller for receiving a perforated record strip, circuit closers actuated by said record strip, a first motor, a first gear train between said motor and said roller, a first switch for controlling the operation of said motor, operating means for opening and closing said switch, a framework, a carriage mounted for translatory movement on said framework, means for moving said carriage in a first direction, a second motor, a shaft for moving said carriage in a reverse direction, a second gear train connecting said second motor and said shaft, a second switch for opening and closing the operating circuit of said second motor, a first electromagnet, circuit connections from one of said circuit closers to said first electromagnet for operating the latter, a second electromagnet, a first circuit extending from said operating means and controlled by operation of said first electromagnet to open said first switch, and a second circuit extending from said operating means and controlled by operation of said second electromagnet to close said first switch.

30. In a device of the class described, the combination of a feeding roller for receiving a perforated record strip, circuit closers actuated by said record strip, a first motor, a first gear train between said motor and said roller, a first switch for controlling the operation of said motor, operating means for opening and closing said switch, a framework, a carriage mounted for translatory movement on said framework, means for moving said carriage in a first direction, a second motor, a shaft for moving said carriage in a reverse direction, a second gear train connecting said second motor and said shaft, a second switch for opening and closing the operating circuit of said second motor, a first electromagnet, circuit connections from one of said circuit closers to said first electromagnet for operating the latter, a second electromagnet, a first circuit extending from said operating means and controlled by operation of said first electromagnet to open said first switch, a second circuit extending from said operating means and controlled by operation of said second electromagnet to close said first switch, and a circuit closer operated by said carriage and connected with said second electromagnet for operating the latter.

31. In a device of the class described, the combination of a feeding roller for receiving a perforated record strip, circuit closers actuated by said record strip, a first motor, a first gear train between said motor and said roller, a first switch for controlling the operation of said motor, operating means for opening and closing said switch, a framework, a carriage mounted for translatory movement on said framework, means for moving said carriage in a first direction, a second motor, a shaft for moving said carriage in a reverse direction, a second gear train connecting said second motor and said shaft, a clutch in said second gear train, a first electromagnet, circuit connections from one of said circuit closers to said first electromagnet for operating the latter, a second electromagnet, a circuit closer operated by said carriage and connected with said second electromagnet for operating the latter, means controlled by said first electromagnet for closing said clutch, and means controlled by said second electromagnet for opening said clutch.

32. In a device of the class described, the combination of a feeding roller for receiving a perforated record strip, circuit closers actuated by said record strip, a first motor, a first gear train between said motor and said roller, a first switch for controlling the operation of said motor, operating means for opening and closing said switch, a framework, a carriage mounted for translatory movement on said framework, means for moving said carriage in a first direction, a second motor, a shaft for moving said carriage in a reverse direction, a second gear train connecting said second motor and said shaft, a second switch for opening and closing the operating circuit of said second motor, a first electromagnet for moving said second switch to its closed position, a second electromagnet for moving said second switch to its open position, circuit connections from one of said circuit closers to said first electromagnet for operating the latter, a circuit closer operated by said carriage and connected with said second electromagnet for operating the latter, a first circuit extending from said operating means and controlled by operation of said first electromagnet to open said first switch, and a second circuit extending from said operating means and controlled by operation of said second electromagnet to close said first switch.

33. In a device of the class described, the combination of a feeding roller for receiving a perforated record strip, circuit closers actuated by said record strip, a first motor, a first gear train between said motor and said roller, a first switch for controlling the operation of said motor, operating means for opening and closing said switch, a framework, a carriage mounted for translatory movement on said framework, means for moving said carriage in a first direction, a second motor, a shaft for moving said carriage in a reverse direction, a second gear train connecting said second motor and said shaft, a second switch for opening and closing the operating circuit of said second motor, a first electromagnet for moving said second switch to its closed position, a second electromagnet for moving said second switch to its open position, circuit connections from one of said circuit closers to said first electromagnet for operating the latter, a circuit closer operated by said carriage and connected with said second electromagnet for operating the latter, a first circuit extending from said operating means and controlled by operation of said first electromagnet to open said first switch, a second circuit extending from said operating means and controlled by operation of said second electromagnet to close said first switch, a clutch in said second gear train, a spring tending to open said clutch, and a third electromagnet energized by the closing of said second switch for moving said clutch to its closed position.

34. In a device of the class described, the combination of a roller for receiving a continuous and perforated record strip, contact fingers mounted adjacent said roller and tending to move towards said roller, contacts controlled by said fingers, pivoted supports for said fingers and contacts whereby said supports may be moved with said fingers and contacts towards or away from said roller as desired, a typewriter having key-levers, electromagnets, armatures for said electromagnets, mechanical connections between said key-levers and said armatures, and circuit connections extending in the form of a cable from said contacts to said electromagnets.

35. In a device of the class described, the combination of a roller for receiving a continuous and perforated record strip, contact fingers mounted adjacent said roller and tending to move towards said roller, contacts controlled by said fingers, pivoted supports for said fingers and contacts whereby said supports may be moved with said fingers and contacts towards or away from said roller as desired, a slotted guide for said fingers, a terminal bar, springs engaging said fingers and extending through the slots of said guide and secured to said terminal bar to form terminals for said fingers, said guide and terminal bar being secured to said pivoted supports, a typewriter having key-levers, electromagnets, armatures for said electromagnets, mechanical connections between said key-levers and said armatures, and circuit connections extending in the form of a cable from said contacts to said electromagnets.

36. In a device of the class described, the combination of a roller for receiving a continuous and perforated record strip, contact fingers mounted adjacent said roller and tending to move towards said roller, contacts controlled by said fingers, pivoted supports for said fingers and contacts whereby said supports may be moved with said fingers and contacts towards or away from said roller as desired, a metal bar supporting a back contact for each of said fingers and forming a common electrical connection for said back contacts, said metal bar being secured to said pivoted supports whereby motion of said supports towards or away from said roller produces no change in the adjustment of said contacts, a slotted guide for said fingers, a terminal bar, springs engaging said fingers and extending through the slots of said guide and secured to said terminal bar to form terminals for said fingers, said guide and terminal bar being secured to said pivoted supports, a typewriter having key-levers, electromagnets, armatures for said electromagnets, mechanical connections between said key-levers and said armatures, and circuit connections extending in the form of a cable from said contacts to said electromagnets.

37. In a device of the class described, the combination of a roller for receiving a continuous and perforated record strip, contact fingers mounted adjacent said roller and tending to move towards said roller, contacts controlled by said fingers, pivoted supports for said fingers and contacts whereby said supports may be moved with said fingers and contacts towards or away from said roller as desired, a box for receiving the record strip in looped condition, a partition in said box for guiding the record strip, a typewriter having key-levers, electromagnets, armatures for said electromagnets, mechanical connections between said key-levers and said armatures, and circuit connections extending in the form of a cable from said contacts to said electromagnets.

38. In a device of the class described, the combination of a roller for receiving a continuous and perforated record strip, contact fingers mounted adjacent said roller and tending to move towards said roller, contacts controlled by said fingers, pivoted supports for said fingers and contacts whereby said supports may be moved with said fingers and contacts towards or away from said roller as desired, a framework carrying bearings for the ends of said roller, one of said bearings being removable from said framework and affording when removed a clearance for removing said roller from the other of said bearings, a typewriter having key-levers, electromagnets, armatures for said electromagnets, mechanical connections between said key-levers and said armatures, and circuit connections extending in the form of a cable from said contacts to said electromagnets.

39. In a device of the class described, the combination of a roller for receiving a continuous and perforated record strip, contact fingers mounted adjacent said roller and tending to move towards said roller, contacts controlled by said fingers, pivoted supports for said fingers and contacts whereby said supports may be moved with said fingers and contacts towards or away from said roller as desired, a typewriter having key-levers, electromagnets, armatures for said electromagnets, mechanical connections between said key-levers and said armatures, circuit connections extending in the form of a cable from said contacts to said electromagnets, said cable being in sections, a multiple plug secured to the end of one section, and a multiple socket secured to the end of another section, said plug and socket having aligning indications for connecting corresponding conductors of said sections when said plug is placed in said socket.

40. In a device of the class described, the combination of a roller for receiving a continuous and perforated record strip, contact fingers mounted adjacent said roller and tending to move towards said roller, contacts controlled by said fingers, pivoted supports for said fingers and contacts whereby said supports may be moved with said fingers and contacts towards or away from said roller as desired, a slotted guide for said fingers, a terminal bar, springs engaging said fingers and extending through the slots of said guide and secured to said terminal bar to form terminals for said fingers, said guide and terminal bar being secured to said pivoted supports, a typewriter having key-levers, electromagnets, armatures for said electromagnets, mechanical connections between said key-levers and said armatures, circuit connections extending in the form of a cable from said contacts to said electromagnets, said cable being in sections, a multiple plug secured to the end of one section, and a multiple socket secured to the end of another section, said plug and socket having aligning indications for connecting corresponding conductors of said sections when said plug is placed in said socket.

41. In a device of the class described, the combination of a roller for receiving a continuous and perforated record strip, contact fingers mounted adjacent said roller and tending to move towards said roller, contacts controlled by said fingers, pivoted supports for said fingers and contacts whereby said supports may be moved with said fingers and contacts towards or away from said roller as desired, a metal bar supporting a back contact for each of said fingers and forming a common electrical connection for said back contacts, said metal bar being secured to said pivoted supports whereby motion of said supports towards or away from said roller produces no change in the adjustment of said contacts, a slotted guide for said fingers, a terminal bar, springs engaging said fingers and extending through the slots of said guide and secured to said terminal bar to form terminals for said fingers, said guide and terminal bar being secured to said pivoted supports, a typewriter having key-levers, electromagnets, armatures for said electromagnets, mechanical connections between said key-levers and said armatures, circuit connections extending in the form of a cable from said contacts to said electromagnets, said cable being in sections, a multiple plug secured to the end of one section, and a multiple socket secured to the end of another section, said plug and socket having aligning indications for connecting corresponding conductors of said sections when said plug is placed in said socket.

42. In a device of the class described, the combination of a feeding roller for receiving a perforated record strip, circuit closers actuated by said record strip, a first motor, a first gear train between said motor and said roller, a first switch for controlling the operation of said motor, operating means for opening and closing said switch, a typewriter having a movable carriage, a platen revolvably mounted on said carriage, devices for imparting a step-by-step movement to said platen, an electromagnet carried by said carriage, operating mechanism between said electromagnet and said platen moving devices, and a circuit extending from one of said circuit closers to said electromagnet.

43. In a device of the class described, the combination of a feeding roller for receiving a perforated record strip, circuit closers actuated by said record strip, a first motor, a first gear train between said motor and said roller, a first switch for controlling the operation of said motor, operating means for opening and closing said switch, a typewriter having a movable carriage, a platen revolvably mounted on said carriage, devices for imparting a step-by-step movement to said platen, an electromagnet carried by said carriage, operating mechanism between said electromagnet and said platen moving devices, electric conductors extending from said electromagnet for controlling the operation of the same, devices connected with said conductors comprising contact bars and contact springs in sliding engagement with said bars, and a circuit extending from one of said circuit closers to said devices.

44. In a device of the class described, the combination of a feeding roller for receiving a perforated record strip, circuit closers actuated by said record strip, a first motor, a first gear train between said motor and said roller, a first switch for controlling the operation of said motor, operating means for opening and closing said switch, a typewriter having a movable carriage, a platen revolvably mounted on said carriage, devices for imparting a step-by-step movement to said platen, an electromagnet carried by said carriage, operating mechanism between said electromagnet and said platen moving devices, electric conductors extending from said electromagnet for controlling the operation of the same, devices connected with said conductors comprising contact bars and contact springs in sliding engagement with said bars, said contact bars being carried by and insulated from said carriage and said contact springs having a fixed support relatively to said carriage, and a circuit extending from one of said circuit closers to said contact springs.

45. In a device of the class described, the combination of circuit closing devices for controlling a plurality of individual circuits, a plurality of typewriters each having type actuating devices and electromagnets for individually operating said actuating devices, and circuits from said circuit closing devices to said electromagnets, whereby operation of any one of said circuit closing devices effects simultaneous operation of corresponding ones of said electromagnets, one for each typewriter.

46. In a device of the class described, the combination of circuit closing devices for controlling a plurality of individual circuits, a plurality of typewriters each having key-levers and carriage operating mechanisms, an electromagnet for each typewriter for controlling each of said key-levers and mechanisms, and an individual circuit from each of said devices to the corresponding electromagnet of each typewriter, whereby operation of any one of said devices simultaneously operates the corresponding part of each typewriter.

47. In a device of the class described, the combination of circuit closing devices for controlling a plurality of individual circuits, a plurality of typewriters each having key-levers and carriage operating mechanisms, an electromagnet for each typewriter for controlling each of said key-levers and mechanisms, and an individual circuit from each of said devices to the corresponding electromagnet of each typewriter, whereby operation of any one of said devices simultaneously operates the corresponding part of each typewriter, said circuits forming cables, one of said cables extending from said circuit closing devices to each typewriter.

48. In a device of the class described, the combination of circuit closing devices for controlling a plurality of individual circuits, a plurality of typewriters each having key-levers and carriage operating mechanisms, an electromagnet for each typewriter for controlling each of said key-levers and mechanisms, an individual circuit from each of said devices to the corresponding electromagnet of each typewriter, whereby operation of any one of said devices simultaneously operates the corresponding part of each typewriter, said circuits forming cables, one of said cables extending from said circuit closing devices to each typewriter, and separable connections in one of said cables comprising a multiple plug and a multiple socket.

49. In a device of the class described, the combination of circuit closing devices for controlling a plurality of individual circuits, a plurality of typewriters each having key-levers and carriage operating mechanisms, an electromagnet for each typewriter for controlling each of said key-levers and carriage operating mechanisms, an electromagnet for each typewriter for controlling each of said key-levers and mechanisms, and an individual circuit from each of said devices to the corresponding electromagnet of each typewriter, whereby operation of any one of said devices simultaneously operates the corresponding part of each typewriter, said devices comprising a roller for receiving a perforated record strip, fingers adjacent said roller tending to move towards said roller, and contacts operated by said fingers.

50. In a device of the class described, the combination of circuit closing devices for controlling a plurality of individual circuits, a plurality of typewriters each having key-levers and carriage operating mechanisms, an electromagnet for each typewriter for controlling each of said key-levers and mechanisms, and an individual circuit from each of said devices to the corresponding electromagnet of each typewriter, whereby operation of any one of said devices simultaneously operates the corresponding part of each typewriter, said devices comprising a roller for receiving a perforated record strip, fingers adjacent said roller tending to move towards said roller, contacts operated by said fingers, and pivoted supports for said fingers and contacts, whereby said fingers and contacts may be moved away from said roller without change of adjustment to remove and insert a record strip.

51. In a device of the class described, the combination of circuit closing devices for controlling a plurality of individual circuits, a plurality of typewriters each having key-levers and carriage operating mechanisms, an electromagnet for each typewriter for controlling each of said key-levers and mechanisms, and an individual circuit from each of said devices to the corresponding electromagnet of each typewriter, whereby operation of any one of said devices simultaneously operates the corresponding part of each typewriter, said devices comprising a roller for receiving a perforated record strip, fingers adjacent said roller tending to move towards said roller, contacts operated by said fingers, a casing for said devices, a plurality of series of terminals supported by and insulated from each other and from said casing, each of said series of terminals being connected with said circuits extended to one of said typewriters, and a conductor connecting each finger with a corresponding one of each series of terminals.

52. In a device of the class described, the combination of circuit closing devices for controlling a plurality of individual circuits, a plurality of typewriters each having key-levers and carriage operating mechanisms, an electromagnet for each typewriter for controlling each of said key-levers and mechanisms, and an individual circuit from each of said devices to the corresponding electromagnet of each typewriter, whereby operation of any one of said devices simultaneously operates the corresponding part of each typewriter, said circuits forming cables, one of said cables extending from said circuit closing devices to each typewriter, said devices comprising a roller for receiving a perforated record strip, fingers adjacent said roller tending to move towards said roller, contacts operated by said fingers, a casing for said devices, a plurality of series of terminals supported by and insulated from each other and from said casing, each of said series of terminals forming the terminals for one of said cables, and a conductor connecting each finger with a corresponding one of each series of terminals.

53. In a device of the class described, the combination of circuit closing devices for controlling a plurality of individual circuits, a plurality of typewriters each having key-levers and carriage operating mechanisms, an electromagnet for each typewriter for controlling each of said key-levers and mechanisms, and an individual circuit from each of said devices to the corresponding electromagnet of each typewriter, whereby operation of any one of said devices simultaneously operates the corresponding part of each typewriter, said circuits forming cables, one of said cables extending from said circuit closing devices to each typewriter, said devices comprising a roller for receiving a perforated record strip, fingers adjacent said roller tending to move towards said roller, contacts operated by said fingers, a casing for said devices, a plurality of series of terminals supported by and insulated from each other and from said casing, each of said series of terminals forming the terminals for one of said cables, a conductor connecting each finger with a corresponding one of each series of terminals, and separable connections in one of said cables comprising a multiple plug and a multiple socket.

In witness whereof, I hereunto subscribe my name this 27th day of August, A. D. 1919.

GILBERT A. POND.